J. C. STODDARD.
Rotary Cultivator.
No. 24,500.
Patented June 21, 1859.
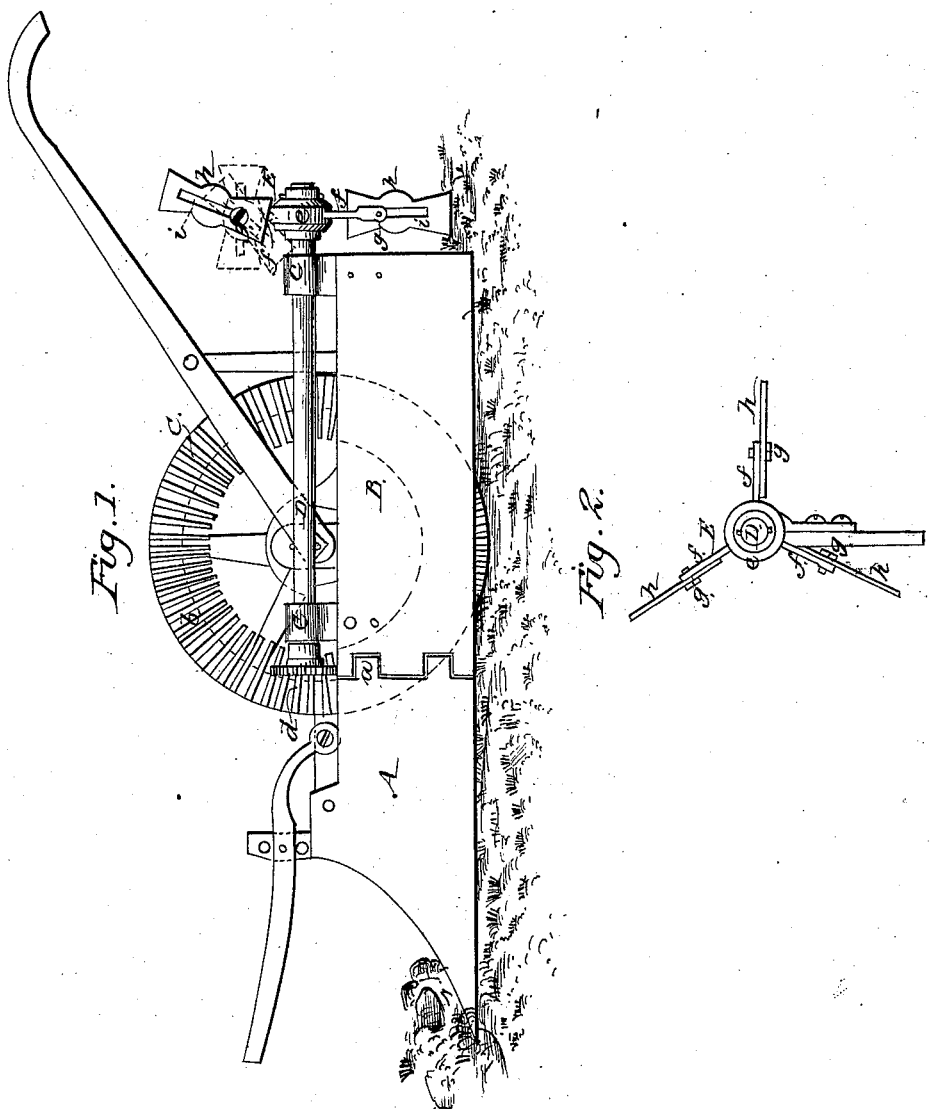

UNITED STATES PATENT OFFICE.

J. C. STODDARD, OF WORCESTER, MASSACHUSETTS.

IMPROVEMENT IN CULTIVATORS.

Specification forming part of Letters Patent No. 24,500, dated June 21, 1859.

*To all whom it may concern:*

Be it known that I, J. C. STODDARD, of Worcester, in the county of Worcester and State of Massachusetts, have invented a new and useful Improvement in Cultivators; and I do hereby declare that the following is a full, clear, and exact description of the same, reference being had to the annexed drawings, making a part of this specification, in which—

Figure 1 is a side view of a cultivator with my invention applied to it. Fig. 2 is a detached face view of my invention.

Similar letters of reference indicate corresponding parts in the two figures.

This invention relates to an improvement in that class of cultivators in which a scraper-wheel (one or more) is used in connection with suitable shares, for the purpose of pulverizing the soil, eradicating weeds, and earthing the plants by the crop under cultivation. The invention, although applicable to all cultivators of the class above mentioned, is more especially designed to be applied to an improved cultivator formerly patented by me, the Letters Patent bearing date March 29, 1859.

The object of the within-described invention is to obtain a scraper-wheel that may be rendered available for earthing various kinds of plants, and its operation otherwise modified, according to the work required for it.

The invention consists in the peculiar construction of the scraper-wheel, substantially as hereinafter fully shown and described, whereby the desired end is attained.

A represents a double share, having two adjustable wings, B B, attached by hinges or joints $a$ to its back ends.

C is a wheel, which is placed behind the share A and between the wings B B. The sides of the wheel C are cogged, as shown at $b$, and on the upper part of each wing B a shaft, D, is placed in proper bearings $c\ c$. On the front end of each shaft D a pinion, $d$, is placed, said pinions gearing into the cogs $b$ of the wheel C. On the back end of each shaft D a scraper-wheel, E, is placed.

The above-mentioned parts, with the exception of the wheels E, are shown in the machine patented by me and previously alluded to, and therefore do not require a more minute description.

The scraper-wheels E are of novel construction, and are formed as follows: A hub, $e$, is attached to the back end of shaft D, and this hub has radial arms $f$ attached, through the outer ends of each of which a set-screw, $g$, passes. These set-screws secure to the end of each arm $f$ a blade or scraper, $h$, which may be of the form plainly shown in Fig. 1. These blades or scrapers are each provided with a longitudinal slot, $i$, through which the set-screws $g$ pass. By this mode of attaching the blades or scrapers $h$ to the arms $f$ the former may be adjusted higher or lower on the arms, so as to have a greater or less "dip," as desired—that is to say, may, as the scraper-wheel rotates, enter the ground a greater or less distance. The blades or scrapers may also be turned or inclined (see dotted lines, Fig. 1) so as to present a greater or less surface to the ground, as may be required. By this arrangement the scraper-wheels E may be adjusted to suit any crop under cultivation, either higher or lower, to penetrate the ground more or less deep, or turned at any point from a vertical to a horizontal position, according to the quantity of earth required to be cast or thrown up to the plants, the chief office of the scraper-wheels being to "earth up" the plants and to pulverize the soil—in fact, to complete the work imperfectly performed by the wings B B.

The scraper $h$ may be also reversed when desired, and their length thus materially shortened, without increasing their lateral width.

I do not claim the share A and adjustable wings B B, for they have been previously used and were formerly patented by me; but What I do claim as new, and desire to secure by Letters Patent, is—

The arrangement and combination of the slotted adjustable reversible blades $h$, arms $f$, and hole $e$, as and for the purposes herein shown and described.

J. C. STODDARD.

Witnesses:
P. EMORY ALDRICH,
JAMES R. PEIRCE.